United States Patent
Marumo et al.

(10) Patent No.: US 10,787,057 B2
(45) Date of Patent: Sep. 29, 2020

(54) AIR CONDITIONER FOR VEHICLE

(71) Applicant: DENSO CORPORATION, Kariya, Aichi-pref. (JP)

(72) Inventors: Asuka Marumo, Kariya (JP); Shun Kurata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 202 days.

(21) Appl. No.: 15/743,867

(22) PCT Filed: Aug. 26, 2016

(86) PCT No.: PCT/JP2016/074964
§ 371 (c)(1),
(2) Date: Jan. 11, 2018

(87) PCT Pub. No.: WO2017/056806
PCT Pub. Date: Apr. 6, 2017

(65) Prior Publication Data
US 2018/0201093 A1    Jul. 19, 2018

(30) Foreign Application Priority Data

Oct. 1, 2015 (JP) .................. 2015-196073

(51) Int. Cl.
  *B60H 1/00* (2006.01)
  *B60H 1/12* (2006.01)
  (Continued)

(52) U.S. Cl.
  CPC ..... *B60H 1/00807* (2013.01); *B60H 1/00314* (2013.01); *B60H 1/00828* (2013.01);
  (Continued)

(58) Field of Classification Search
  CPC ............ B60H 1/00642; B60H 1/00735; B60H 1/00807; B60H 2001/00928; B60H 1/08; B60H 1/12; F01P 2007/146
  See application file for complete search history.

(56) References Cited

U.S. PATENT DOCUMENTS 9,080,796 B2 *  7/2015  Shaikh .................... F25B 27/00
9,604,521 B2 *  3/2017  Hirabayashi ....... B60H 1/00921
(Continued)

FOREIGN PATENT DOCUMENTS

| DE | 112012005256 T5 | 10/2014 |
|---|---|---|
| DE | 102014102078 A1 | 8/2015 |
| JP | 2007223418 A * | 9/2007 |

*Primary Examiner* — Nelson J Nieves
*Assistant Examiner* — Meraj A Shaikh
(74) *Attorney, Agent, or Firm* — Harness, Dickey & Pierce, P.L.C.

(57) ABSTRACT

A vehicle air conditioner includes a bypass passage configured to cause a coolant to circulate while bypassing a heater core, a switching device set to switch between a first mode in which the coolant flows through the bypass passage and returns to an internal combustion engine while bypassing the heater core and a second mode in which the coolant flows to the heater core, a coolant-temperature sensor that detects a temperature of the coolant at a part through which the coolant flows in both the first mode and the second mode, and a control unit that controls an operation of a blower based on the coolant-temperature control data. Furthermore, first and second calculating portions are configured to calculate the coolant-temperature control data in the first and second modes, respectively. The first calculating portion calculates the coolant-temperature control data based on the temperature of the coolant detected at start-up of the internal combustion engine, and the second calculating portion sets, as the coolant-temperature control data, a temperature lower than the detected temperature of the coolant.

17 Claims, 3 Drawing Sheets

(51) Int. Cl.
  *B60H 1/04*   (2006.01)
  *B60H 1/32*   (2006.01)
(52) U.S. Cl.
  CPC ..... *B60H 1/00885* (2013.01); *B60H 1/00892* (2013.01); *B60H 1/04* (2013.01); *B60H 1/12* (2013.01); *B60H 1/00064* (2013.01); *B60H 1/3219* (2013.01); *B60H 2001/3292* (2013.01)

(56) References Cited

U.S. PATENT DOCUMENTS

| | | | |
|---|---|---|---|
| 2003/0101961 A1* | 6/2003 | Foster | F01N 3/0885 123/198 F |
| 2008/0229768 A1* | 9/2008 | Nakamura | B60H 1/00828 62/148 |
| 2009/0145141 A1 | 6/2009 | Akahoshi et al. | |
| 2011/0120146 A1* | 5/2011 | Ota | B60H 1/03 62/3.3 |
| 2012/0037336 A1* | 2/2012 | Ishikawa | B60H 1/00314 165/51 |
| 2014/0144998 A1* | 5/2014 | Ichishi | B60H 1/004 237/12.3 A |
| 2014/0360215 A1* | 12/2014 | Inaba | B60H 1/00485 62/216 |
| 2014/0373563 A1 | 12/2014 | Mizutani et al. | |
| 2015/0218998 A1* | 8/2015 | Ishihata | F02G 5/02 60/320 |

\* cited by examiner

AIR CONDITIONER FOR VEHICLE

CROSS REFERENCE TO RELATED APPLICATIONS

This application is a U.S. National Phase Application under 35 U.S.C. 371 of International Application No. PCT/JP2016/074964 filed on Aug. 26, 2016 and published in Japanese as WO 2017/056806 A1 on Apr. 6, 2017. This application is based on and claims the benefit of priority from Japanese Patent Application No. 2015-196073 filed on Oct. 1, 2015. The entire disclosures of all of the above applications are incorporated herein by reference.

FIELD OF THE INVENTION

The present disclosure relates to an air conditioner for a vehicle, which heats air to be blown into a vehicle interior by using a coolant for cooling an internal combustion engine.

BACKGROUND ART

Conventionally, some vehicles are known, which are set to switch between a first mode in which a coolant for cooling an internal combustion engine (hereinafter referred to as an engine) circulates while bypassing a heater core and a second mode in which the coolant flows through the heater core. When the coolant temperature is low, such as upon cold start-up, the first mode is set. As the coolant temperature is raised, the first mode is switched to the second mode.

In such vehicles, a coolant-temperature sensor that detects the coolant temperature is disposed at a part where the coolant flows constantly. This kind of technology is described, for example, in Patent Document 1.

In normal vehicle air conditioners, the coolant temperature detected by the coolant-temperature sensor is used as coolant-temperature control data, and based on the control coolant-temperature date, an air volume, a blowing-air temperature, and the like are controlled. In a vehicle air conditioner where the coolant constantly flows through the heater core, the coolant-temperature control data corresponds to an estimated temperature of the heater core.

RELATED ART DOCUMENT

Patent Document

Patent Document 1: Japanese Unexamined Patent Application Publication No. 2007-223418

SUMMARY OF INVENTION

However, in the vehicle which is set to switch the coolant flow to the first mode or the second mode, a coolant circuit is divided into an engine-side coolant circuit and a heater core-side circuit in the first mode, and thereby the coolants in the respective coolant circuits have different temperatures. The engine-side coolant circuit is a circuit in which the coolant temperature increases due to the influence of heat generation of the engine in the first mode. The heater core-side circuit is a circuit in which the coolant temperature does not increase without being influenced by heat generation from the engine in the first mode.

Since the coolant-temperature sensor is disposed at the part through which the coolant constantly flows, the coolant temperature in the heater core-side circuit is not detected in the first mode. If the coolant temperature in the engine-side coolant circuit, detected by the coolant-temperature sensor, is set as the coolant-temperature control data, a difference between the coolant-temperature control data and the temperature of the heater core would become large. Thus, in this case, the control of the air volume, the blowing air temperature, and the like cannot be performed appropriately, thereby impairing the comfort provided by the air conditioner.

There is a time lag between when the mode is switched to the second mode and when the high-temperature coolant in the engine-side coolant circuit reaches the heater core. During this time lag, there occurs a difference between the coolant temperature detected by the coolant-temperature sensor and the coolant temperature in the heater core.

Thus, when the coolant temperature in the engine-side coolant circuit, detected by the coolant-temperature sensor, is used as the coolant-temperature control data, the difference between the coolant-temperature control data and the temperature of the heater core would become large. Consequently, the control of the air volume, the blowing air temperature, and the like are difficult to execute appropriately, thus impairing the comfort.

Upon cold start-up in winter, the first mode is set for the purpose of warming up the engine at an early stage. In the first mode, the coolant temperature in the heater core is a low temperature, corresponding to an outside air temperature (for example, −30° C.).

Thereafter, the engine warming-up is finished to switch to the second mode, in which the high-temperature coolant in the engine-side coolant circuit then flows into the heater core-side circuit. If a predetermined time has elapsed since switching to the second mode, the high-temperature coolant in the engine-side coolant circuit reaches the heater core, so that the temperature of the heater core is raised to, for example, 80° C.

Meanwhile, immediately after switching to the second mode, the low-temperature coolant in the heater core-side circuit flows into the engine-side coolant circuit to thereby temporarily decrease the coolant temperature in the engine-side coolant circuit. When the coolant having its temperature decreased temporarily reaches the heater core, the heater core temperature is also decreased to, for example, 50 to 60° C.

Subsequently, the temperature of the whole coolant in the circuits increases to a target temperature of the coolant, so that the coolant becomes isothermalized as a whole.

As a result, in the air conditioner that heats air by using the coolant circulating through the heater core as a heat source, the blowing air temperature varies along with the above-mentioned phenomenon, i.e., the change in the heater core temperature after switching to the second mode, thus impairing the comfort.

In normal vehicle air conditioners, warm-up control is performed to restrict the air volume when the coolant temperature is low. In this case, the air volume varies along with the variations in the coolant temperature detected by the coolant-temperature sensor after switching to the second mode, thus impairing the comfort. Likewise, hunting may occur in various types of control executed based on the coolant-temperature control data, together with variations in the coolant temperature detected by the coolant-temperature sensor after the switching to the second mode, thereby impairing the comfort.

If another coolant-temperature sensor is additionally disposed in the heater core-side circuit, the above-mentioned problems will not occur. In such a case, the addition of the coolant-temperature sensor leads to an increase in cost.

Accordingly, it is an object of the present disclosure to improve the comfort provided by an air conditioner without additionally installing another coolant-temperature sensor for detecting the coolant temperature in the air conditioner which is mounted on a vehicle designed to switch and set the flow of an engine coolant.

An air conditioner for a vehicle that performs air-conditioning of a vehicle interior includes: a blower that blows air into the vehicle interior; a circulation passage through which a coolant for cooling an internal combustion engine circulates; a heater core disposed in the circulation passage and configured to heat air to be blown into the vehicle interior by using the coolant; a bypass passage connected to the circulation passage, the bypass passage being configured to cause the coolant to circulate while bypassing the heater core; a switching device set to switch between a first mode in which the coolant flowing out of the internal combustion engine flows through the bypass passage and returns to the internal combustion engine while bypassing the heater core, and a second mode in which the coolant flowing out of the internal combustion engine flows to the heater core; a coolant-temperature sensor that detects a temperature of the coolant at a part of the circulation passage through which the coolant flows in both the first mode and the second mode; a control unit that controls an operation of the blower based on a coolant-temperature control data; a first coolant-temperature data calculating portion that calculates the coolant-temperature control data in the first mode; and a second coolant-temperature data calculating portion that calculates the coolant-temperature control data until a predetermined time has elapsed from the switching to the second mode. The first coolant-temperature data calculating portion calculates the coolant-temperature control data based on a temperature of the coolant detected by the coolant-temperature sensor at start-up of the internal combustion engine, and the second coolant-temperature data calculating portion sets, as the coolant-temperature control data, a temperature lower than the temperature of the coolant detected by the coolant-temperature sensor.

Thus, while the first mode is set, the coolant-temperature control data is calculated based on the coolant temperature detected by the coolant-temperature sensor at start-up of the internal combustion engine, thereby making it possible to reduce a difference between the coolant-temperature control data and the actual temperature of the heater core. Therefore, the control of the air volume, the blowing air temperature, and the like can be performed appropriately, thereby improving the comfort provided by the air conditioner.

Until the predetermined time has elapsed from the switching to the second mode, a temperature lower than the coolant temperature detected by the coolant-temperature sensor is set as the coolant-temperature control data. Consequently, a difference between the coolant-temperature control data and the actual temperature of the heater core can be reduced. Therefore, the control of the air volume, the blowing air temperature, and the like can be performed appropriately, thereby improving the comfort.

Furthermore, until the predetermined time has elapsed from the switching to the second mode, variations in the coolant-temperature control data is suppressed, thereby suppressing variations in the air volume, as well as occurrence of hunting in various types of control.

DESCRIPTION OF EMBODIMENTS

In the following, an embodiment will be described.

Figure 1:
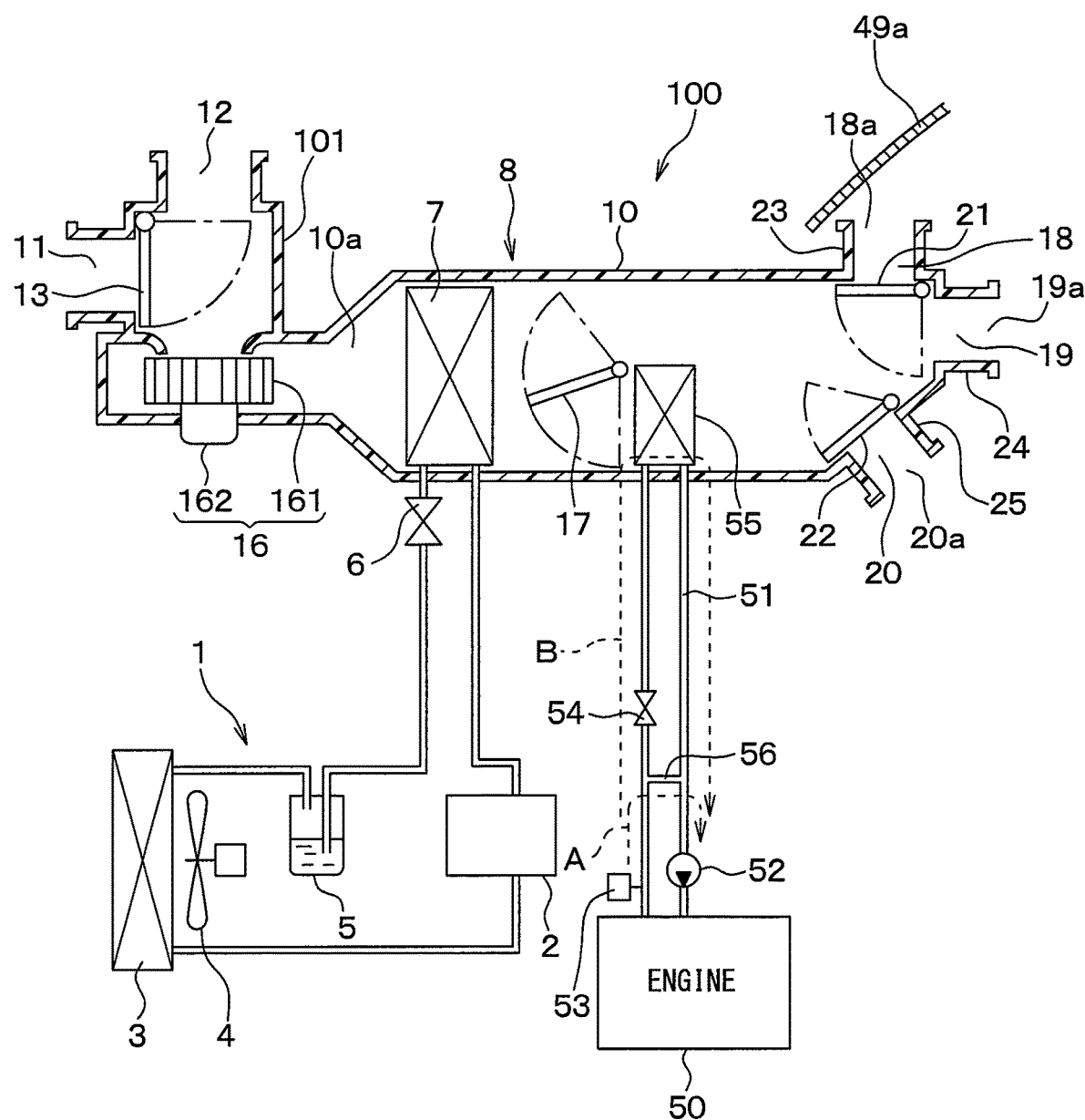
FIG. 1 is a diagram showing an entire structure of a vehicle air conditioner according to an embodiment.
Figure 2:
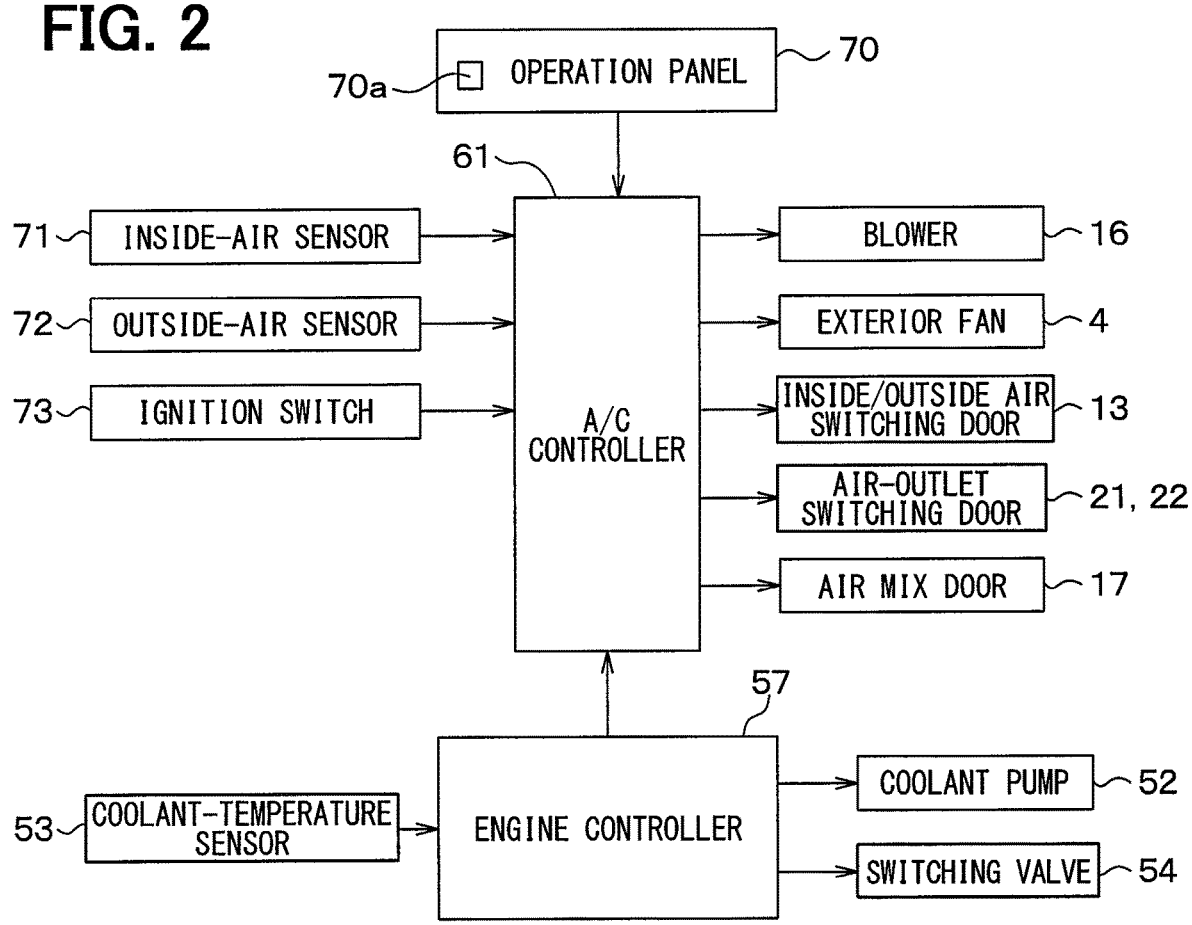
FIG. 2 is a block diagram showing an electric configuration of the vehicle air conditioner shown in FIG. 1.

As shown in FIGS. 1 and 2, a vehicle air conditioner 100 is mounted on a vehicle that obtains a traveling driving force from an internal combustion engine (hereinafter referred to as an engine) 50 as a traveling driving source.

The engine 50 includes a circulation passage 51 through which an engine coolant for cooling the engine 50 circulates.

A coolant pump 52, a coolant-temperature sensor 53, a switching valve 54, and a heater core 55 are disposed in the circulation passage 51. The coolant pump 52 causes the engine coolant to circulate within the circulation passage 51. The coolant-temperature sensor 53 detects a temperature of the engine coolant and outputs an electric signal corresponding to the detected temperature. The switching valve 54 is a switching device that opens and closes the circulation passage 51.

The coolant pump 52 is driven by an electric motor. The amount of power supplied to the electric motor of the coolant pump 52 is controlled by an engine controller 57, thereby controlling the flow rate of the coolant circulating through the circulation passage 51. The switching valve 54 is driven by an electromagnetic solenoid or electric motor and controlled by the engine controller 57. The coolant-temperature sensor 53 in use is a thermo-sensitive element, for example, a thermistor. An electric signal output from the coolant-temperature sensor 53 is input to the engine controller 57.

The circulation passage 51 is connected to a bypass passage 56 through which the engine coolant is caused to circulate while bypassing the heater core 55. Specifically, one end of the bypass passage 56 is connected between the engine 50 and the switching valve 54 in the circulation passage 51, while the other end of the bypass passage 56 is connected between the engine 50 and the heater core 55 in the circulation passage 51.

When the switching valve 54 closes the circulation passage 51, as indicated by a dotted arrow with reference character A, the engine coolant flowing out of the engine 50 flows through the bypass passage 56 and thereby returns to the engine 50 while bypassing the heater core 55.

Meanwhile, when the switching valve 54 opens the circulation passage 51, the engine coolant is allowed to flow to the heater core 55. Thus, at this time, as indicated by a dotted arrow with reference character B, the engine coolant flowing out of the engine 50 returns to the engine 50 through the heater core 55.

The coolant-temperature sensor 53 is disposed at the part through which the engine coolant flows either when the switching valve 54 closes the circulation passage 51 or when the switching valve 54 opens the circulation passage 51. Specifically, the coolant-temperature sensor 53 is disposed between the engine 50 and the above-mentioned one end side of the bypass passage 56.

The vehicle air conditioner 100 includes a refrigeration cycle 1, an air-conditioning unit 8, and an air-conditioning controller 61. The vehicle air conditioner 100 is an automatic air-conditioning system that performs air-conditioning of the vehicle interior. That is, the vehicle air conditioner 100 is configured to control the air-conditioning unit 8 to perform air-conditioning of the vehicle interior by using the air-conditioning controller 61.

The air-conditioning unit 8 is disposed inside an instrument panel at the foremost portion of the vehicle interior. The air-conditioning unit 8 draws one or both of inside air as the air in the vehicle interior and outside air as the air outside the vehicle interior and adjusts the temperature of the air drawn thereinto to blow out the air into the vehicle interior.

The air-conditioning unit 8 includes an evaporator 7, an air-conditioning case 10, an inside/outside air switching door 13, a blower 16, an air mix door 17, a plurality of air-outlet switching doors 21 and 22, and the heater core 55. The evaporator 7 is included in the refrigeration cycle 1 as well as in the air-conditioning unit 8.

The air-conditioning case 10 forms a casing of the air-conditioning unit 8. One side of the air-conditioning case 10 is provided with air suction ports 11 and 12, while the other side thereof is provided with a plurality of air outlets through which air passes toward the vehicle interior. The air-conditioning case 10 has a ventilation passage 10a located between the air suction ports 11 and 12 and the air outlet and through which the ventilation air passes.

The air-conditioning case 10 has, on its upstream side (i.e., on one side), an air suction portion 101 with two air suction ports 11 and 12 formed therein. One of the two air suction ports 11 and 12 is an inside-air suction port 11 that draws the inside air, and the other thereof is an outside-air suction port 12 that draws the outside air.

The inside/outside air switching door 13 is a suction-port opening/closing device that increases and decreases the opening degree of the inside-air suction port 11 and the opening degree of the outside-air suction port 12. The inside/outside air switching door 13 rotatably operates within the air suction portion 101 and is driven by an actuator, such as a servo motor. In detail, the inside/outside air switching door 13 rotates such that as one of the inside-air suction port 11 and the outside-air suction port 12 is open more, the other thereof is closed more, thus adjusting the ratio of the flow rate of the inside air flowing into the air suction portion 101 to the outside air flowing thereinto. The opening degree of the inside-air suction port 11 is a degree of opening of the inside-air suction port 11, whereas the opening degree of the outside-air suction port 12 is a degree of opening of the outside-air suction port 12.

The blower 16 blows the air such that the air flowing into the air suction portion 101 flows to the evaporator 7, and then the air passing through the evaporator 7 flows out into the vehicle interior. Because of this, the blower 16 has a vane wheel 161 as a centrifugal fan and a blowing electric motor 162 coupled to the vane wheel 161.

The vane wheel 161 of the blower 16 is disposed on the downstream side of an air flow in the air-conditioning case 10 with respect to the air suction portion 101 and on the upstream side of the air flow with respect to the evaporator 7. The vane wheel 161 includes a plurality of fan blades and is rotatably driven by the blowing electric motor 162, which is controlled by the air-conditioning controller 61, thus generating an air flow directed toward the vehicle interior within the air-conditioning case 10. For example, in the blower 16, the number of revolutions of the vane wheel 161 is controlled by the air-conditioning controller 61 to thereby increase or decrease the air volume of the air blown from the respective air outlets toward the vehicle interior.

The evaporator 7 is disposed on the downstream side of the air flow with respect to the vane wheel 161 of the blower 16 in the air-conditioning case 10. The evaporator 7 is an air-cooling heat exchanger. That is, the evaporator 7 exchanges heat between the refrigerant decompressed by an expansion valve 6 and the ventilation air sent from the blower 16, thereby cooling the ventilation air while evaporating and vaporizing the refrigerant by the heat exchange.

The heater core 55 is disposed on the downstream side of the air flow with respect to the evaporator 7 in the air-conditioning case 10 and provided to partially cover the ventilation passage 10a. The heater core 55 heats the ventilation air passing through the ventilation passage 10a by exchanging heat between the ventilation air and the engine coolant.

The air mix door 17 is disposed on the upstream side of the air flow with respect to the heater core 55 and on the downstream side of the air flow with respect to the evaporator 7. The air mix door 17 is driven by the actuator, such as a servo motor, to change the temperature of air blown from each air outlet toward the vehicle interior. In other words, the air mix door 17 adjusts the ratio of the air volume between cold air passing through the evaporator 7 and flowing while bypassing the heater core 55 and hot air passing through the evaporator 7 and then through the heater core 55, depending on the rotation position of the air mix door 17.

In the refrigeration cycle 1, the refrigerant circulating through the refrigeration cycle 1 absorbs heat in the evaporator 7, and dissipates heat in the condenser 3. The refrigeration cycle 1 is configured of a compressor 2, the condenser 3, a receiver 5, the expansion valve 6, the evaporator 7, and refrigerant pipes that annularly connect these components.

The compressor 2 is coupled to the engine 50 via an electromagnetic clutch (not shown). The compressor 2 obtains a driving force from the engine 50 to draw, compress, and discharge the refrigerant. The intermittence of the electromagnetic clutch interposed between the compressor 2 and the engine 50 is controlled by the air-conditioning controller 61.

The condenser 3 is provided in a place that is susceptible to traveling air generated when a vehicle, such as an engine room, travels. The refrigerant compressed by the compressor 2 flows into the condenser 3, and the condenser 3 condenses and liquefies the compressed refrigerant. That is, the condenser 3 exchanges heat between the refrigerant flowing inside the condenser 3 and the traveling air and the outside air blown by an exterior fan 4.

The receiver 5 separates a liquid-phase refrigerant and a vapor-phase refrigerant, contained in the refrigerant flowing out of the condenser 3. The receiver 5 causes the separated liquid-phase refrigerant to flow out to the expansion valve 6.

The expansion valve 6 decompresses and expands the refrigerant from the receiver 5 and causes the decompressed and expanded refrigerant to flow out to the evaporator 7. The evaporator 7 then evaporates and vaporizes the refrigerant from the expansion valve 6. The refrigerant evaporated and vaporized in the evaporator 7 is drawn into the compressor 2.

The air-conditioning case 10 is provided with a defroster opening 18, a face opening 19, and a foot opening 20. These openings 18, 19, and 20 are disposed on the most downstream side of the air flow in the air-conditioning case 10.

The defroster opening 18 is connected to a defroster duct 23. At the end on the most downstream side of the defroster duct 23, a defroster air outlet 18a is open. The defroster air outlet 18*a* mainly blows the hot air toward an inner surface of a windshield 49*a* of the vehicle, i.e., an inner surface of the front glass window 49*a*.

The face opening 19 is connected to a face duct 24. At the end on the most downstream side of the face duct 24, a face air outlet 19*a* is open. The face air outlet 19*a* mainly blows cold air toward the head and chest of an occupant.

Further, the foot opening 20 is connected to a foot duct 25. At the end on the most downstream side of the foot duct 25, a foot air outlet 20*a* is open to mainly blow hot air toward the foot of the occupant.

Inside the respective openings 18, 19, and 20, two air-outlet switching doors 21 and 22 are rotatably mounted. The two air-outlet switching doors 21 and 22 are respectively driven by an actuator, such as a servo motor. The two air-outlet switching doors 21 and 22 are capable of selectively switching an air outlet mode of the air-conditioning unit 8 among the face mode, the bi-level mode, the foot mode, the foot defroster mode, and the defroster mode.

Next, an electric configuration of the vehicle air conditioner 100 will be described below. As shown in FIG. 2, switching signals from respective switches on an operation panel 70 provided at the front surface of the vehicle interior, sensor signals from respective sensors, and communication signals output from the engine controller 57 and the like are input to the air-conditioning controller 61.

Here, the operation panel 70 will be described. The operation panel 70 is integrally mounted with the instrument panel. The operation panel 70 (not shown) includes, for example, a liquid crystal display, an inside/outside air selector switch, a defroster switch, a blowing mode selector switch, a blowing air volume selector switch, an automatic switch, a temperature setting switch, and an air conditioner switch 70*a*.

The liquid crystal display has a display region provided for visually displaying a preset temperature, a blowing mode, a blowing air volume, and the like. The liquid crystal display may have a display region provided for visually displaying, for example, an outside air temperature, a suction mode, a time, and the like.

Various switches on the operation panel 70 will be described below. The defroster switch is a switch that sets a blowing mode to the defroster mode and commands enhancement of an antifogging capacity of a front window glass 49*a*. The mode selector switch is a switch that requests the blowing mode to be set to any one of the face mode, the bi-level mode, the foot mode, and the foot defroster mode, in accordance with an occupant's manual operation. The temperature setting switch is a switch for setting the temperature at a desired temperature.

The air conditioner switch 70*a* is a switch that commands the compressor 2 in the refrigeration cycle 1 to operate and stop. When the air conditioner switch 70*a* is switched ON with the ignition turned on, the air-conditioning unit 8 performs an air-conditioning operation in which the air cooled by the evaporator 7, or the air cooled by the evaporator 7 and heated by the heater core 55 is blown into the vehicle interior. The automatic switch is a switch that commands the execution of the automatic air-conditioning control which involves automatically performing air-conditioning of the vehicle interior.

Within the air-conditioning controller 61, the well-known microcomputer is provided to have functions (not shown), including a CPU for conducting arithmetic processing and control processing (i.e., a central processing unit), a memory such as a ROM and a RAM, and an I/O port (i.e., input/output circuit). Both the ROM and RAM are non-transitory physical storage media. After the sensor signals from the respective various sensors are converted from analog to digital, i.e., ND converted by the I/O port or ND conversion circuit to be input to the microcomputer.

The air-conditioning controller 61 is connected to an inside-air sensor 71 and an outside-air sensor 72. The inside-air sensor 71 detects an inside air temperature, which is the temperature of air around a driver's seat in the vehicle interior. The outside-air sensor 72 detects the outside air temperature, which is the temperature of the air outside the vehicle interior.

The inside-air sensor 71 and the outside-air sensor 72 utilize a thermo-sensitive element, for example, a thermistor. The inside-air sensor 71 is set at a part around the driver's seat (for example, inside the instrument panel near a steering wheel) that is hardly affected even when any air outlet, other than an air outlet for the driver's seat, is closed.

An ignition switch 73 is connected to the air-conditioning controller 61. A switching signal for the switch indicative of a switching position of the ignition switch 73 is also input to the air-conditioning controller 61. The ignition switch 73 is a switch provided near the driver's seat and operated by an occupant. The ignition switch 73 is the well-known switch for switching the operation of the engine 50 between a permission state and a refusal state. For example, the ON of the ignition switch 73 is a switching state of the switch that permits the operation of the engine 50, whereas the OFF of the ignition switch 73 is a switching state of the switch that refuses the operation of the engine 50 and turns off predetermined accessory equipment, such as an audio device. Thus, after finishing the usage of the vehicle, the occupant switches OFF the ignition switch 73.

A communication signal or the like output from the engine controller 57 is input to the air-conditioning controller 61. Specifically, information on the flow rate of a coolant circulating through the circulation passage 51, on the engine coolant temperature detected by the coolant-temperature sensor 53, on the operating state of the switching valve 54, and the like is input to the air-conditioning controller. The engine controller 57 calculates the flow rate of the coolant circulating through the circulation passage 51, based on the amount of power supplied to the electric motor of the coolant pump 52.

Next, engine coolant control processing executed by the engine controller 57 will be described.

First, when the engine 50 is started up, the switching valve 54 receives a control signal from the engine controller 57 to close the circulation passage 51. The coolant pump 52 receives a control signal from the engine controller 57 to cause the engine coolant to circulate inside the circulation passage 51.

When the switching valve 54 closes the circulation passage 51, the engine coolant flowing out of the engine 50 flows through the bypass passage 56, and thereby returns to the engine 50 while bypassing the heater core 55.

Hereinafter, a coolant circuit mode formed when the switching valve 54 closes the circulation passage 51 is referred to as a first mode. A coolant circuit in the circulation passage 51 through which the engine coolant flows in the first mode is referred to as an engine-side coolant circuit. A coolant circuit in the circulation passage 51 through which the engine coolant does not flow in the first mode is referred to as a heater core-side circuit.

Figure 3:
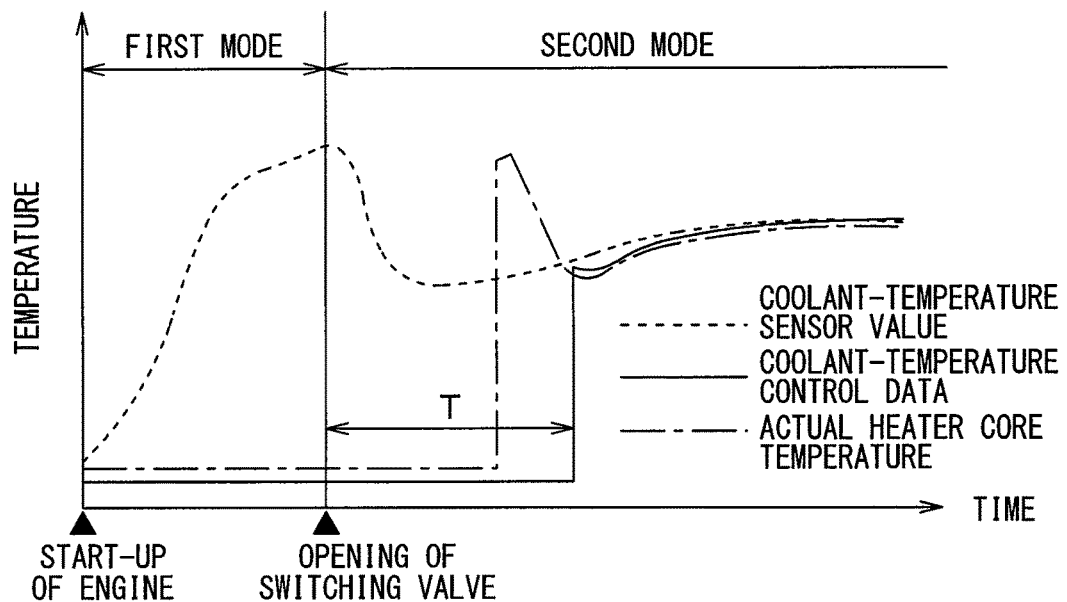
FIG. 3 is a diagram for explaining an operation of the vehicle air conditioner according to the embodiment.

Here, the dotted line in FIG. 3 indicates the temperature of the engine coolant detected by the coolant-temperature sensor 53, i.e., the temperature of the engine coolant in the engine-side coolant circuit. As shown in FIG. 3, after start-up of the engine 50, the temperature of the engine coolant in the engine-side coolant circuit increases over time. When the temperature of the engine coolant reaches a preset temperature, the switching valve 54 receives a control signal from the engine controller 57 to open the circulation passage 51.

When the switching valve 54 opens the circulation passage 51, the engine coolant flowing out of the engine 50 also flows to the heater core-side circuit and returns to the engine 50 through the heater core 55. Hereinafter, a coolant circuit mode formed when the switching valve 54 opens the circulation passage 51 is referred to as a second mode.

Now, the control processing executed by the air-conditioning controller 61 will be described based on FIGS. 3 and 4. The alternate long and short dash line in FIG. 3 indicates a temperature of the heater core 55, whereas the solid line in FIG. 3 indicates the coolant-temperature control data.

In the control processing as described in detail below, the air-conditioning controller 61 calculates the coolant-temperature control data and controls the operation of an air-conditioning control device, such as the blower 16, based on the coolant-temperature control data.

Figure 4:
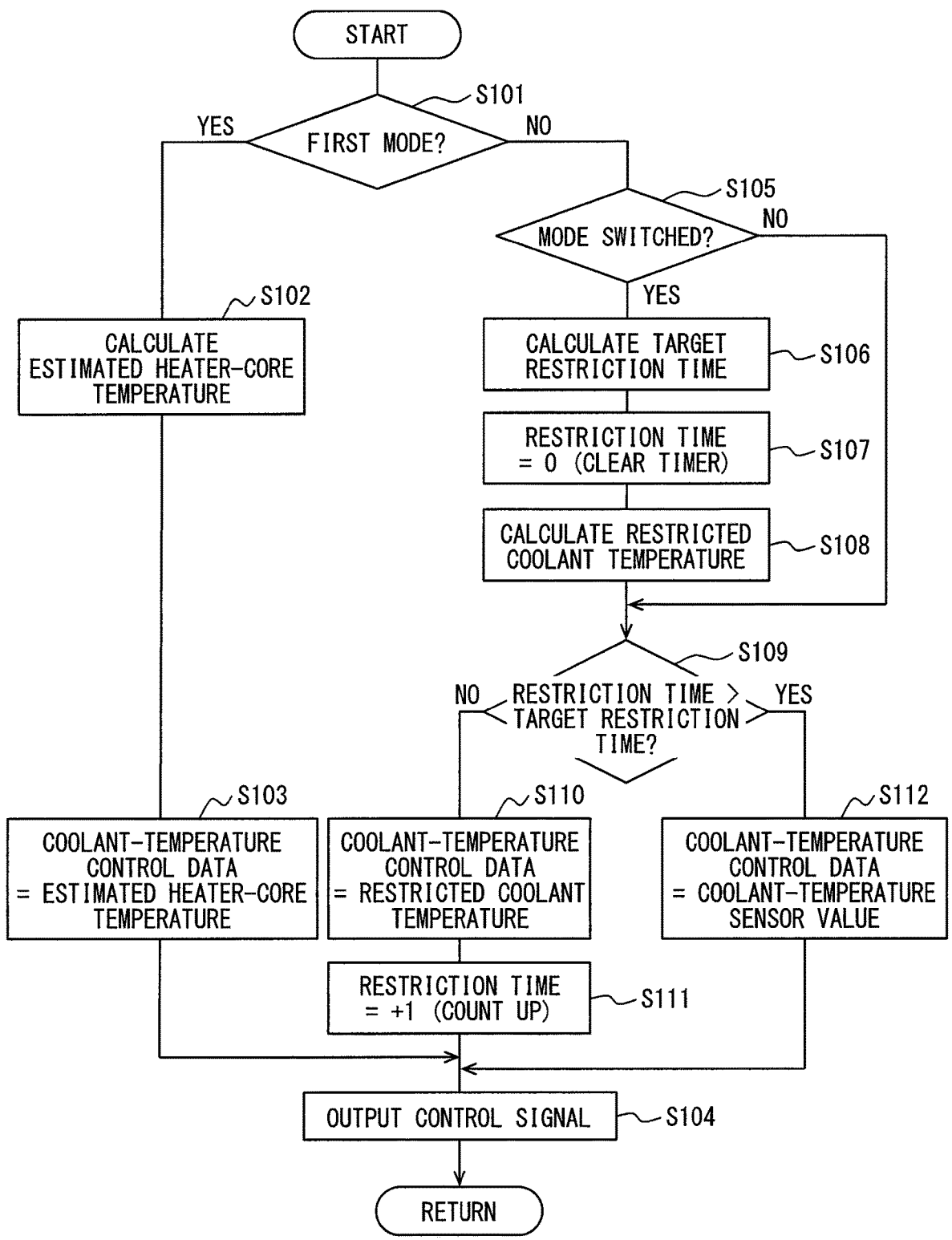
FIG. 4 is a flowchart showing control processing executed by an air-conditioning controller shown in FIG. 2.

When the ignition switch 73 of the vehicle is turned on and the air conditioner switch 70a is switched ON, the air-conditioning controller 61 repeatedly executes the control processing periodically as shown in the flowchart of FIG. 4. Therefore, while the air-conditioning unit 8 executes an air-conditioning operation, the control processing shown in FIG. 4 is executed in parallel with the air-conditioning operation. That is, the control processing shown in FIG. 4 is executed in parallel with other control processing concerned with the air-conditioning operation of the air-conditioning unit 8, for example, control processing included in the automatic air-conditioning control.

First, in step S101 shown in FIG. 4, the air-conditioning controller 61 determines whether or not a coolant circuit mode is the first mode based on information concerned with the operating state of the switching valve 54 and output from the engine controller 57.

Like immediately after the start-up of the engine 50, when the temperature of the engine coolant detected by the coolant-temperature sensor 53 is in a low-temperature range which is less than a preset temperature, the switching valve 54 closes the circulation passage 51, and the first mode is set. Thus, in step S101, affirmative determination is made, and the processing proceeds to step S102.

In step S102, an estimated temperature of the heater core 55 (hereinafter referred to as an estimated heater-core temperature) is calculated based on the information concerned with the engine coolant, detected by the coolant-temperature sensor 53 output from the engine controller 57.

Specifically, upon cold start-up, the temperature of the engine coolant detected by the coolant-temperature sensor 53 is substantially equal to the temperature of the heater core 55. Because of this, the estimated heater-core temperature is regarded as the temperature of the engine coolant detected by the coolant-temperature sensor 53 at the start-up of the engine 50. Thus, the difference between the estimated heater-core temperature and an actual temperature of the heater core 55 can be reduced.

Subsequently, the processing proceeds from step S102 to step S103. In step S103, the coolant-temperature control data is calculated. Specifically, when the affirmative determination is made in step S101 because the first mode is set, the estimated heater-core temperature calculated in step S102 is set as the coolant-temperature control data. Steps S102 and S103 configure a first coolant-temperature data calculating portion.

Subsequently, the processing proceeds from step S103 to step S104. In step S104 serving as a control unit, a target operation value of the air-conditioning control device, such as the blower 16, is calculated based on the coolant-temperature control data calculated in step S103, and then a control signal corresponding to the calculated target operation value is output to the air-conditioning control device. The air-conditioning control devices other than the blower 16 can include the inside/outside air switching door 13, the air mix door 17, and the air-outlet switching doors 21 and 22.

In the way described above, the coolant-temperature control data is calculated while the first mode is set. Thus, as shown in FIG. 3, the difference between the coolant-temperature control data provided while the first mode is set and an actual temperature of the heater core 55 can be reduced. Therefore, while the first mode is set, the control of the air volume, the blowing air temperature, and the like can be performed appropriately, thereby improving the comfort.

Meanwhile, when the temperature of the engine coolant detected by the coolant-temperature sensor 53 reaches a preset temperature after starting the operation of the engine 50 while the first mode is set, the switching valve 54 opens the circulation passage 51 to switch to the second mode. Thus, in step S101, negative determination is made, and the processing then proceeds to step S105.

When switching from the first mode to the second mode, affirmative determination is made in step S105, and the processing then proceeds to step S106.

In step S106, a period of time during which a restricted coolant temperature to be described later is used as the coolant-temperature control data, i.e., a target restriction time T is calculated.

As shown in FIG. 3, the target restriction time T corresponds to a period of time (hereinafter referred to as an isothermalizing time) from when the first mode is switched to the second mode to when the temperature of the heater core 55 becomes substantially equal to the temperature of the engine coolant detected by the coolant-temperature sensor 53.

Specifically, the target restriction time T is calculated in the following way. The target restriction time T corresponds to a predetermined time of the present disclosure.

The temperature of the heater core 55 obtained upon switching to the second mode is substantially equal to the coolant-temperature control data calculated in step S103. The isothermalizing time takes longer as a temperature difference is increased, the temperature difference being a difference between the temperature of the heater core 55 upon switching to the second mode and the temperature of the engine coolant detected by the coolant-temperature sensor 53 upon switching to the second mode.

For this reason, the target restriction time T is lengthened as the difference between the coolant-temperature control data calculated in step S103 and the temperature of the engine coolant detected by the coolant-temperature sensor 53 upon switching to the second mode becomes larger. Thus, the difference between the timing at which the temperature of the heater core 55 becomes substantially equal to the temperature of the engine coolant detected by the coolant-temperature sensor 53 and the timing at which the target restriction time T is ended can be reduced.

As the flow rate of the coolant circulating through the circulation passage 51 becomes less, the isothermalizing time takes longer. For this reason, as the flow rate of the coolant circulating through the circulation passage 51 becomes less, the target restriction time T is lengthened based on information concerned with the flow rate of the coolant circulating through the circulation passage 51 and output from the engine controller 57. Thus, the difference between the timing at which the temperature of the heater core 55 becomes substantially equal to the temperature of the engine coolant detected by the coolant-temperature sensor 53 and the timing at which the target restriction time T is ended can be reduced.

As the blowing amount of the blower 16 becomes larger, the amount of heat absorbed from the engine coolant is increased, so that the temperature increase of the engine coolant becomes moderate. Thus, the blowing amount of the blower 16 is calculated based on the number of revolutions of the blower 16. As the blowing amount of the blower 16 becomes more, the target restriction time T is lengthened. Thus, the difference between the timing at which the temperature of the heater core 55 becomes substantially equal to the temperature of the engine coolant detected by the coolant-temperature sensor 53 and the timing at which the target restriction time T is ended can be reduced.

In an inside air mode of blowing the inside air heated by the heater core 55, into the vehicle interior, as the inside air temperature becomes lower, the amount of heat absorbed from the engine coolant is increased, so that the temperature increase of the engine coolant becomes moderate. Because of this, in the inside air mode, as the inside air temperature detected by the inside-air sensor 71 becomes lower, the target restriction time T is lengthened. Thus, the difference between the timing at which the temperature of the heater core 55 becomes substantially equal to the temperature of the engine coolant detected by the coolant-temperature sensor 53 and the timing at which the target restriction time T is ended can be reduced.

In an outside air mode of blowing the outside air heated by the heater core 55, into the vehicle interior, as the outside air temperature becomes lower, the amount of heat absorbed from the engine coolant is increased, so that the temperature increase of the engine coolant becomes moderate. Because of this, in the outside air mode, as the outside air temperature detected by the outside-air sensor 72 becomes lower, the target restriction time T is lengthened. Thus, the difference between the timing at which the temperature of the heater core 55 becomes substantially equal to the temperature of the engine coolant detected by the coolant-temperature sensor 53 and the timing at which the target restriction time T is ended can be reduced.

Subsequently, the processing proceeds from step S106 to step S107. In step S107, in order to measure a restriction time which is an elapsed time after switching to the second mode, a timer for the restriction time is cleared and set at zero (0).

Subsequently, the processing proceeds from step S107 to step S108. In step S108, a restricted coolant temperature is calculated. Specifically, the restricted coolant temperature is set at a temperature lower than the temperature of the engine coolant detected by the coolant-temperature sensor 53. In more detail, the restricted coolant temperature is defined as the coolant-temperature control data calculated in step S103. The restricted coolant temperature is used to suppress variations in the coolant-temperature control data while the temperature of the engine coolant varies significantly.

Then, the processing proceeds from step S108 to step S109. In step S109, it is determined whether or not the restriction time exceeds the target restriction time T. If the restriction time is equal to or shorter than the target restriction time T, negative determination is made in step S109, and the processing proceeds to step S110.

In step S110, the coolant-temperature control data is calculated. Specifically, when negative determination is made in step S109 because the restriction time is equal to or less than the target restriction time T, the restricted coolant temperature calculated in step S108 is set as the coolant-temperature control data. Here, the restricted coolant temperature calculated in step S108 is the same as the coolant-temperature control data calculated in step S103. Therefore, as shown in FIG. 3, the coolant-temperature control data obtained while the first mode is set is equal to the coolant-temperature control data obtained when the restriction time is equal to or less than the target restriction time T. Steps S106, S108, and S110 configure a second coolant-temperature data calculating portion.

Subsequently, the processing proceeds from step S110 to step S111. In step S111, in order to measure the restriction time, the restriction time is counted up. Consequently, a value of the restriction time is increased by one count.

Then, the processing proceeds from step S111 to step S104. In step S104, a target operation value of the air-conditioning control device, such as the blower 16, is calculated based on the coolant-temperature control data calculated in step S110, and then a control signal corresponding to the calculated target operation value is output to the air-conditioning control device.

Next, when the operation of the engine 50 continues in the second mode, negative determination is made in step S105, and then the processing proceeds to step S109.

If the restriction time is equal to or shorter than the target restriction time T, the processing proceeds to step S104 through steps S110 and S111. In step S104, the control signal is output to the air-conditioning control device as mentioned above.

As described above, until the target restriction time T has elapsed since the switching to the second mode, a temperature lower than the temperature of the engine coolant detected by the coolant-temperature sensor 53 is set as the coolant-temperature control data, thus making it possible to reduce a difference between the coolant-temperature control data and the actual temperature of the heater core 55. Therefore, the control of the air volume, the blowing air temperature, and the like can be performed appropriately, thereby improving the comfort.

Furthermore, until the target restriction time T has elapsed since the switching to the second mode, variations in the coolant-temperature control data is suppressed, thereby suppressing variations in the air volume and occurrence of hunting in various types of control.

Meanwhile, when the restriction time exceeds the target restriction time T, affirmative determination is made in step S109, and the processing proceeds to step S112.

In step S112, the coolant-temperature control data is calculated. When the restriction time exceeds the target restriction time T, it is estimated that the temperature of the heater core 55 becomes substantially equal to the temperature of the engine coolant detected by the coolant-temperature sensor 53. Therefore, in step S112, the temperature of the engine coolant detected by the coolant-temperature sensor 53 is set as the coolant-temperature control data.

Subsequently, the processing proceeds from step S112 to step S104. In step S104, a target operation value of the air-conditioning control device, such as the blower 16, is calculated based on the coolant-temperature control data calculated in step S112, and then a control signal corresponding to the calculated target operation value is output to the air-conditioning control device.

According to the present embodiment, while the first mode is set, the coolant-temperature control data is calculated based on the temperature of the engine coolant detected by the coolant-temperature sensor 53 at the start-up of the engine 50, thereby making it possible to reduce a difference between the coolant-temperature control data and the actual temperature of the heater core 55. Therefore, the control of the air volume, the blowing air temperature, and the like can be performed appropriately, thereby improving the comfort.

Until the target restriction time T has elapsed since the switching to the second mode, the temperature lower than the temperature of the engine coolant detected by the coolant-temperature sensor 53 is set as the coolant-temperature control data, thus making it possible to reduce a difference between the coolant-temperature control data and the actual temperature of the heater core 55. Therefore, the control of the air volume, the blowing air temperature, and the like can be performed appropriately, thereby improving the comfort.

Furthermore, until the target restriction time T has elapsed after the switching to the second mode, variations in the coolant-temperature control data are suppressed, thereby suppressing variations in the air volume and occurrence of hunting in various types of control.

First Modification

In step S102 of the above-mentioned embodiment, the air-conditioning controller 61 sets the temperature of the engine coolant detected by the coolant-temperature sensor 53 at the start-up of the engine 50, as the estimated heater-core temperature. Instead of this, however, in step S102, the air-conditioning controller 61 may correct the temperature of the engine coolant detected by the coolant-temperature sensor 53 at the start-up of the engine 50 and may set the corrected temperature as the estimated heater-core temperature. The air-conditioning controller 61 performs this correction such that as the outside air temperature detected by the outside-air sensor 72 at the start-up of the engine 50 becomes higher, the temperature after the correction becomes higher.

Second Modification

In step S108 of the above-mentioned embodiment, the air-conditioning controller 61 sets the coolant-temperature control data calculated in step S103 as the restricted coolant temperature. Instead of this, however, in step S108, the air-conditioning controller 61 may correct the coolant-temperature control data calculated in step S103 so that the data increases as the time elapses after the switching to the second mode. The air-conditioning controller 61 may set the coolant-temperature control data obtained after the correction, as the restricted coolant temperature. Also in this modification, the restricted coolant temperature is set at a temperature lower than the temperature of the engine coolant detected by the coolant-temperature sensor 53.

Third Modification

In the second modification, the air-conditioning controller 61 may reduce a change amount per time in the coolant-temperature control data as the flow rate of the engine coolant circulating through the circulation passage 51 becomes less.

Fourth Modification

In the second modification, the air-conditioning controller 61 may reduce a change amount per time in the coolant-temperature control data as the blowing volume of the blower 16 becomes larger.

Fifth Modification

In the second modification, the air-conditioning controller 61 in the inside air mode may reduce a change amount per time in the coolant-temperature control data, as the inside air temperature detected by the inside-air sensor 71 becomes lower.

Sixth Modification

In the second modification, the air-conditioning controller 61 in the outside air mode may reduce a change amount per time in the coolant-temperature control data, as the outside air temperature detected by the outside-air sensor 72 becomes lower.

Other Embodiments

The present disclosure is not limited to the above-mentioned embodiments, and various modifications and changes can be made to the embodiments.

It is obvious that in the above-mentioned embodiment, the elements included in the embodiment are not necessarily essential unless otherwise specified to be particularly essential, except when clearly considered to be essential in principle, and the like.

When referring to specific numbers about a component, including the number, a numerical value, an amount, a range, and the like in the above-mentioned embodiment, the component in the embodiments should not be limited to the specific number unless otherwise specified to be particularly essential and except when limited to the specific number in principle.

Even when referring to the shape and the positional relationship of components and the like in the above-mentioned embodiment, the component in the embodiment should not be limited to such a shape, positional relationship, or the like unless otherwise specified and except when obviously limited to the specific shape, positional relationship, and the like in principle.

The above-mentioned embodiment and modifications can be combined as appropriate except when their combination seems obviously impossible.

What is claimed is:

1. An air conditioner for a vehicle that performs air-conditioning of a vehicle interior, comprising:
   a blower that blows air into the vehicle interior;
   a circulation passage through which a coolant for cooling an internal combustion engine circulates;
   a heater core disposed in the circulation passage and configured to heat air to be blown into the vehicle interior by using the coolant;
   a bypass passage connected to the circulation passage, the bypass passage being configured to cause the coolant to circulate while bypassing the heater core;

a switching device configured to switch between a first mode in which the coolant flowing out of the internal combustion engine flows through the bypass passage and returns to the internal combustion engine while bypassing the heater core, and a second mode in which the coolant flowing out of the internal combustion engine flows to the heater core;

a coolant-temperature sensor that detects a temperature of the coolant at a part of the circulation passage through which the coolant flows in both the first mode and the second mode; and a controller configured to calculate (i) a first coolant-temperature control data based on a temperature of the coolant detected by the coolant-temperature sensor at start-up of the internal combustion engine in the first mode, and (ii) a second coolant-temperature control data based on a temperature lower than the temperature of the coolant detected by the coolant-temperature sensor, for a predetermined time after the switching device switches from the first mode to the second mode, wherein the controller is configured to control operation of the blower based on the first coolant-temperature control data in the first mode, and to control operation of the blower based on the second coolant-temperature control data for the predetermined time after the switching device switches from the first mode to the second mode.

2. The air conditioner for a vehicle according to claim 1, further comprising:

an outside-air sensor that detects a temperature of outside air, wherein the controller is configured to correct a temperature of the coolant detected by the coolant-temperature sensor at the start-up of the internal combustion engine such that the detected temperature of the coolant becomes higher as a temperature of outside air detected by the outside air sensor at the start-up of the internal combustion engine becomes higher, and then sets the corrected temperature of the coolant as the first coolant-temperature control data.

3. The air conditioner for a vehicle according to claim 1, wherein the controller is configured to set the first coolant-temperature control data calculated as the second coolant-temperature control data.

4. The air conditioner for a vehicle according to claim 1, wherein the controller is configured to increase a value of the second coolant-temperature control data after the predetermined time after the switching device switches from the first mode to the second mode.

5. The air conditioner for a vehicle according to claim 1, wherein the controller is configured to lengthen the predetermined time as a difference between the first coolant-temperature control data calculated by the controller upon the switching device switching from the first mode to the second mode and a temperature of the coolant detected by the coolant-temperature sensor upon the switching device switching from the first mode to the second mode becomes larger.

6. The air conditioner for a vehicle according to claim 1, wherein the controller is configured to lengthen the predetermined time as a flow rate of the coolant circulating through the circulation passage becomes less.

7. The air conditioner for a vehicle according to claim 1, wherein the controller is configured to lengthen the predetermined time as a blowing amount of the blower becomes larger.

8. The air conditioner for a vehicle according to claim 1, further comprising an inside-air sensor that detects a temperature of the vehicle interior, wherein the controller is configured to lengthen the predetermined time as the temperature of the vehicle interior detected by the inside-air sensor becomes lower in an inside air mode in which air within the vehicle interior is heated by the heater core to be blown into the vehicle interior.

9. The air conditioner for a vehicle according to claim 1, further comprising an outside-air sensor that detects a temperature of outside air, wherein the controller is configured to lengthen the predetermined time as the temperature of the outside air detected by the outside-air sensor becomes lower in an outside air mode in which outside air is heated by the heater core to be blown into the vehicle interior.

10. The air conditioner for a vehicle according to claim 4, wherein the controller is configured to reduce the second coolant-temperature control data, as a flow rate of the coolant circulating through the circulation passage becomes smaller.

11. The air conditioner for a vehicle according to claim 4, wherein the controller is configured to reduce the second coolant-temperature control data, as a blowing amount of the blower becomes larger.

12. The air conditioner for a vehicle according to claim 4, further comprising an inside-air sensor that detects a temperature of the vehicle interior, wherein the controller is configured to reduce the second coolant-temperature control data, as the temperature of the vehicle interior detected by the inside-air sensor becomes lower in an inside air mode in which air within the vehicle interior is heated by the heater core to be blown into the vehicle interior.

13. The air conditioner for a vehicle according to claim 4, further comprising an outside-air sensor that detects a temperature of outside air, wherein the controller is configured to reduce the second coolant-temperature control data, as the temperature of outside air detected by the outside-air sensor becomes lower in an outside air mode in which outside air is heated by the heater core to be blown into the vehicle interior.

14. The air conditioner for a vehicle according to claim 1, wherein the controller is configured to control operation of the blower without directly using the temperature of the coolant detected by the coolant-temperature sensor.

15. The air conditioner for a vehicle according to claim 1, wherein the temperature of the coolant detected by the coolant-temperature sensor increases throughout the first mode.

16. The air conditioner for a vehicle according to claim 1, wherein the temperature of the coolant detected by the coolant-temperature sensor at start-up of the internal combustion engine in the first mode is substantially equal to a temperature of the heater core.

17. The air conditioner for a vehicle according to claim 16, wherein
the temperature of the heater core is substantially constant throughout the first mode and increases during the second mode.

* * * * *